Oct. 9, 1934.  L. C. CARLTON  1,976,326

VEHICLE SEAT CONSTRUCTION

Original Filed Jan. 27, 1932   2 Sheets-Sheet 1

Inventor,
Lee C. Carlton

Witness:

Oct. 9, 1934.  L. C. CARLTON  1,976,326
VEHICLE SEAT CONSTRUCTION
Original Filed Jan. 27, 1932   2 Sheets-Sheet 2
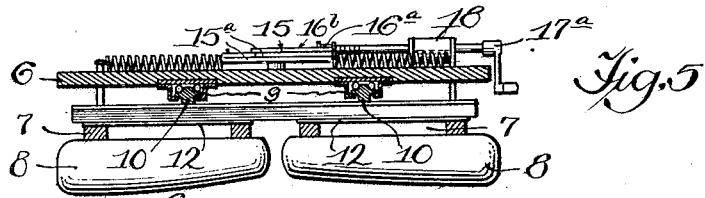
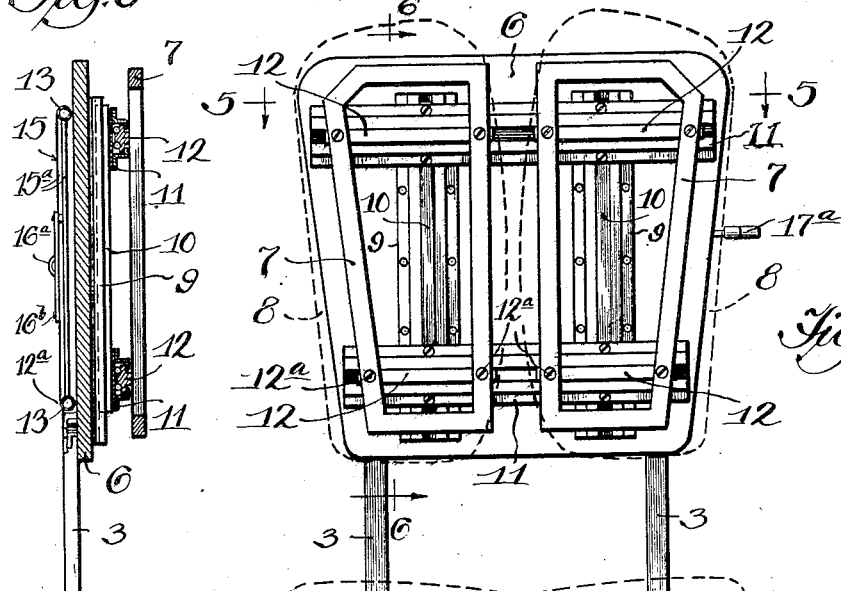
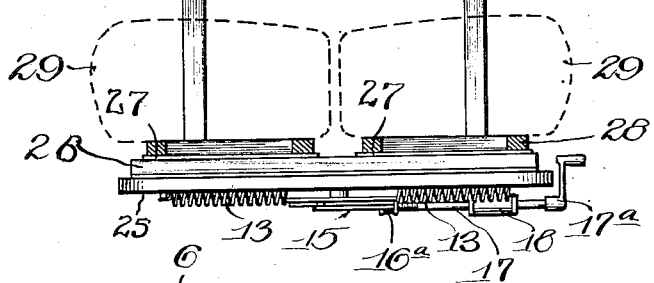
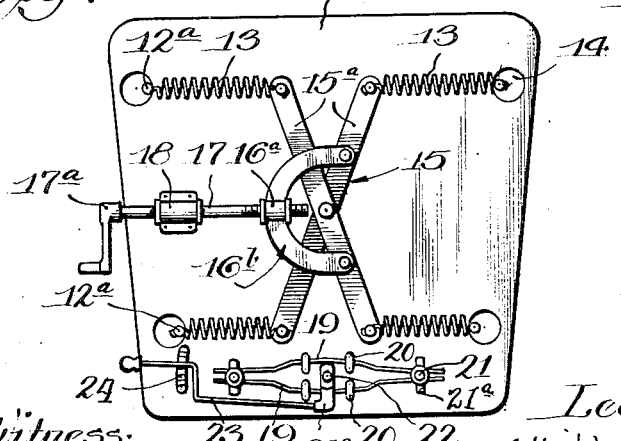

Patented Oct. 9, 1934

1,976,326

UNITED STATES PATENT OFFICE 1,976,326

VEHICLE SEAT CONSTRUCTION

Lee C. Carlton, Chicago, Ill.

Application January 27, 1932, Serial No. 589,083
Renewed March 3, 1934

8 Claims. (Cl. 155—5)

This invention relates to improvements in vehicle seat construction, and more particularly to an improved type of motor vehicle seat designed especially to relieve the fatigue incident to long periods of driving and to promote greater riding comfort for both driver and passenger.

The fatigue and weariness experienced by motorists is generally conceded to be due largely to a muscular tension that attends the unconscious effort of the driver or passenger to brace himself against displacement as the vehicle encounters the natural and ordinary variations in road conditions. As a consequence, the ordinary upholstered vehicle seat affords a high degree of comfort while the vehicle is stationary or traveling at slow speed, but does not insure complete comfort during long periods of travel or over long stretches of road at fairly high speeds. Moreover, motor vehicle seats are designed to conform to a standard of dimensions and hence cannot be expected to give the same degree of comfort to all persons, differing as they do in physical structure, weight and proportions.

The object, therefore, of the present invention is to provide an improved seat construction in which the bottom and back portions are not only divided into sections, but the sections are shiftable independently of each other and against the tension of springs so as to give or yield with the body in the direction or directions calculated to afford the maximum riding comfort.

A preferred embodiment of the invention is disclosed in the accompanying drawings, in which Figure 1 is a perspective view showing the general seating arrangement in a vehicle equipped with the improved type of seats;

Figure 4 is an enlarged detail view in front elevation of a seat showing the construction of frame;

Figure 5 is a detail view in cross section as taken on line 5—5 of Figure 4;

Figure 6 is a detail view in vertical section as taken on line 6—6 of Figure 4; and Figure 7 is a view in rear elevation of the frame of the seat back.

Figure 1:
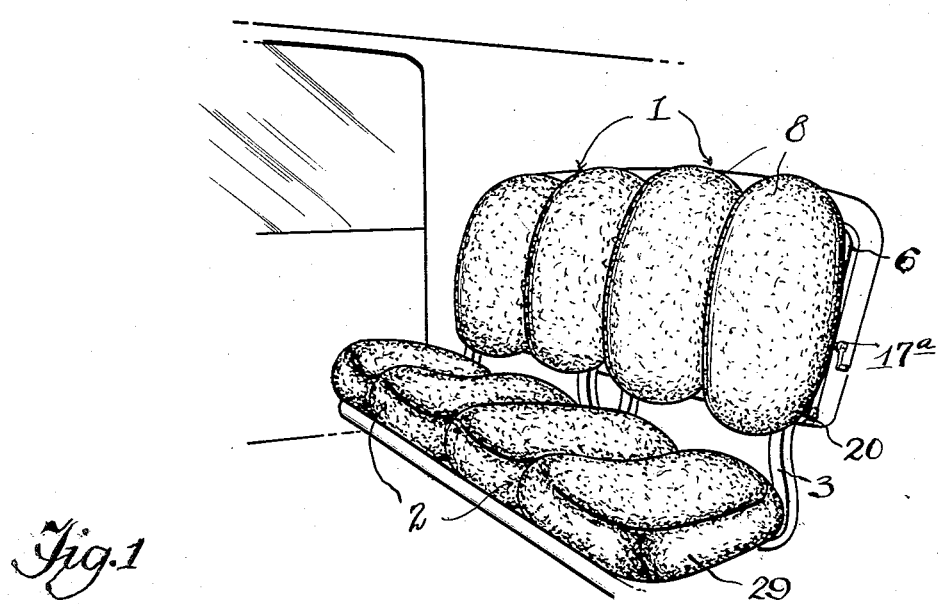

As herein disclosed, the seat embodying the novel features of construction is a unit for single occupancy, but two or more may be arranged side by side for the front and back seats for the ordinary sedan type of pleasure vehicle, as shown in Figure 1. Each seat unit consists of cushioned back and bottom portions 1 and 2, respectively, attached to seat frame members 3, 3, having legs or supports 4 attached to the floor of the vehicle body. The seat frame members 3, 3 are preferably metal bars shaped to provide upright back supporting portions, but in this case they have relatively deep U-shaped looped portions 5 where the back and bottom seat cushions would ordinarily meet, so that as a result, these looped portions form the bottom of an appreciable cavity that drops down between the rear edge of the bottom and back seat portions 1 and 2. The purpose of this cavity is to afford a rather obvious source of convenience and comfort, namely, a space into which the lower portions of the coat or outer garments of the occupant may be draped and arranged to hang vertically and freely of the body, thus avoiding the creasing and wrinkling of the clothing and the discomfort occasioned by sitting for long periods of time upon several thicknesses of folded garment material, as is necessary in vehicle seats of the ordinary design.

Figures 2, 3:
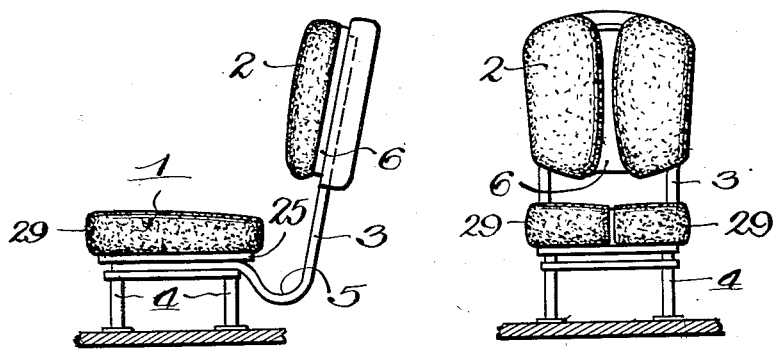
Figure 2 is a view in side elevation of a single seat.
Figure 3 is a view in front elevation of a single seat.

Referring now to the construction of the back and bottom portions 1 and 2, there is a certain similarity between the two which will be more apparent as the description proceeds. The back section 2 will be first considered. A stationary back frame member 6 of wood or metal is secured directly to the upright portions of the seat frame members 3, 3, and on the front face or side of this frame member are two separate open frames 7, 7 arranged side by side and vertically of the stationary supporting frame member 6 with a space of several inches separating them along the center line of the back. To these frames are fixed the back cushions 8, 8 which may be spring-filled or otherwise padded, shaped and upholstered to afford the maximum degree of comfort for the back of the occupant, whether driver or passenger. Thus as shown in Figure 2, the back is divided vertically into two sections or halves, with a space between, and as will now be described, these sections are capable of shifting vertically and laterally and each independently of the other.

Fixed to the stationary back member 6 is a pair of parallel channel members 9, 9 extending vertically and symmetrically of the cushion frames 7, 7 and fixed to the front face of said back member 6. Within these channel bars 9, 9 are located endwise shiftable T-bars 10, 10 preferably riding on ballbearings 10ª, 10ª, and fixed to the ends of the T-bars 10, 10 is a pair of horizontal channel bars 11, 11 which in turn carry pairs of ballbearing mounted T-bars 12, 12, one pair being attached to each of the cushion frame members 7, 7 by bolts 12ª. By this arrangement then, the two back cushions 8, 8 with their frames 7, 7 have a limited upward and downward movement with the body of the occupant, as well as limited lateral or sidewise movement, both movements being possible simultaneously by reason of what might be regarded as a universal mounting of the back cushions 8 upon the stationary frame member 6. It is to be observed, however, that while the two cushion frames may shift independently of one another in a lateral direction, that is, toward and from each other, they shift together in a vertical direction, and by shifting is meant their conformity to the movements imparted to the body of the occupant by the vehicle in motion.

The shifting of the back cushion sections, however, is opposed by tension means in the form of springs capable of adjustment to increase and decrease the tension exerted thereby. Thus the lateral movement of the cushion frames 7, 7 is controlled by two pairs of coil springs 13, 13 mounted on the rear side or face of the stationary back frame member 6, one spring being roughly located at each corner thereof and attached to the outer ends of each of the horizontal T-bars 12 to which the two cushion frames are directly attached at top and bottom, the outermost attaching bolts 12ª being extended through slots 14 in the stationary back and one end of each spring attached thereto (Figure 7). The springs extend horizontally inward from the several pins and at their opposite or inner ends they are connected with a scissors-like adjusting toggle 15 consisting of a pair of crossed levers 15ª, 15ª pivoted at their mid-points, and having a spring connected to the near end of one of the levers. A U-shaped link 16 straddles the pivot joint of the toggle levers, its ends being pivotally connected with the two levers, while a threaded sleeve 16ª at its central point carries a screw shaft 17 extending laterally beyond one edge of the seat and is supported by a journal bracket 18 fixed to the back of the seat frame 6. A handle 17ª at the end of the screw shaft 17 serves as a means for adjusting the toggle levers by closing or opening them, and thus varying the tension exerted by the coil springs 13.

A somewhat different arrangement is used for tensioning the cushion frames against vertical movement, although with the same purpose in view. Along the lower edge of the back of the stationary seat frame member 6 is a pair of stiff leaf springs 19, 19 spaced apart one above the other in parallel relation, their central portions being supported by pairs of horizontally spaced brackets 20, 20, thus providing elongated end portions projecting laterally in both directions and in parallel spaced relation. Now, attached to the lowermost horizontal channel bar 11 are bolts 21 projecting through upright slots 21ª, 21ª in the back frame member 6, and thence between the end portions of the leaf springs 19, 19. And finally between the mid-portions of the springs is an adjusting member 22 in the form of a rotative cam 22ª adapted in one position to extend transversely between the central points of the springs and force them apart, thereby bringing the outer ends closer together and increasing their stiffness, and in the other extreme position to extend parallel with the leaf springs and out of contact therewith, thus permitting them to flex with maximum freedom. This cam is provided with a short crank lever 22ª, and a long operating lever 23 extends laterally from the end of the crank lever 22ª to one side of the seat, there being a toothed rack 24 fixed to the back of the seat frame for holding the lever in one of several adjusted positions, so that by raising or lowering the lever 23, the tension exerted by the springs 19, 19 may be regulated to give the desired degree of restrained vertical movement of the back cushion sections.

The bottom section 1 of the seat is practically a duplication of the back portion, except that it has no forward or backward movement corresponding to the upward and downward movement of the back cushion sections. Thus the seat portion has a stationary horizontal frame member 25, and upon this member is fixed a pair of parallel channel members 26, 26 extending crosswise thereof adjacent the front and rear edges thereof. In these channel members are pairs of T-bars 27, 27 to which are fastened the seat cushion frame members 28, 28 forming the foundation of the sectional seat cushions 29, 29. In short, the mounting of the seat cushions follows precisely that of the back cushions, duplicating the same combination of shiftable members and adjustable tension devices which have heretofore been shown in Figure 7. For this reason the description of this arrangement will not be repeated except to point out that as before a set of four springs on the under side of the stationary frame members 25 are connected with the seat cushion frames 28, and another toggle lever adjustment with a handle located accessibly at one side of the seat is provided, all of which has been described in detail in connection with the back portion of the seat and hence the same reference characters have been used.

As far as the seat section is concerned, the weight of the occupant's body is distributed between the two cushion sections, and when the vehicle is not in motion, the seat assumes a normal condition and differs little, if any, from the ordinary vehicle seat. However, as the body tends to shift with the varying of the vehicle in motion, the seat sections shift accordingly and in a manner calculated to maintain the body in equilibrium, thus relieving the muscular effort to brace the body against displacement. The same is true of the back sections, which yield laterally for the same reason and in addition shift vertically with the body. Thus each seat has four separate sections supporting the body which are capable of six independent spring controlled adjustments. It, of course, would be possible to add a fore and aft adjustment for the bottom seat sections, but such is believed to be unnecessary, if not preferably omitted, for the reason that the occupants are more or less braced against displacement in the direction of travel, particularly in the case of the driver whose position should be more or less fixed with relation to the steering wheel, brake and clutch pedals.

It will be understood that in the practical construction of the seat herein described, the parts would be more compactly assembled than they appear in the drawings, and moreover would be concealed beneath upholstering so that except for the divided seat and back sections and the adjusting handles, the appearance would not be very different from that presented by the ordinary vehicle seat construction. And finally it is to be understood that the construction may be variously modified without departing from the spirit of the invention.

Having set forth a preferred embodiment of my invention, I claim:

1. A vehicle seat comprising a back divided into sections parted along its vertical center line, a fixed support for said sections, means intermediate said fixed support and sections permitting a limited vertical and transverse shifting of said sections.

2. A vehicle seat comprising a back divided into sections parted along its vertical center line, a fixed support for said sections and means intermediate said fixed support and sections permitting a limited vertical and transverse shifting movement of said sections, and adjustable tension means acting on said sections.

3. A vehicle seat comprising a stationary frame, seat and back portions mounted on said frame, one of the same having separate cushioned sections, track members mounted on said frame, track engaging members on said sections permitting their limited shifting movement toward and from each other, and tension means acting to yieldingly oppose the shifting of said sections.

4. A vehicle seat comprising a frame, seat and back portions mounted on said frame, one of said portions consisting of divided cushioned sections slidably mounted on said frame for a limited shifting movement toward and from each other, and tension means acting to yieldingly oppose the shifting of said sections.

5. A vehicle seat comprising a frame, seat and back portions on said frame, each consisting of a pair of cushion sections divided along the longitudinal center line of the seat and slidably mounted on said frame for limited shifting movement toward and from each other, and tension means acting on each of said pairs of cushion sections to yieldingly oppose the shifting of the same from each other.

6. A vehicle seat comprising a frame, seat and back portions, each consisting of a pair of cushion sections divided along the center line of the seat and slidably mounted on said frame for a limited shifting movement toward and from each other, tension means acting on one pair of said sections for opposing the shifting of the same from each other, means intermediate the other pair of cushion sections and said frame for supporting the same for independent shifting movement as a unit longitudinally of said center line, and a plurality of tension means acting on said last mentioned sections to yieldingly resist the shifting movement of said sections as a unit, and the shifting of said sections relative to each other.

7. A vehicle seat for a single occupancy comprising stationary seat and back frame portions, each including a pair of separate cushion sections parted along the center line of the seat and slidably mounted on their respective frame portions for a limited shifting movement toward and from each other with the lateral shifting of the body of the occupant, means for slidably supporting said back cushion sections to shift vertically as a unit and independently of their relative shifting movement, and a plurality of tension means acting on said back sections to yieldingly resist their unitary shifting movement and the relative shifting movement of the sections from each other.

8. A vehicle seat for single occupancy comprising a frame, seat and back portions carried by said frame and each including a pair of cushion sections parted along the longitudinal center line of the seat, said seat sections being slidably mounted to shift toward and from each other in a direction at right angles to said center line, spaced bars secured vertically to said back frame portion, horizontal bars secured to said back cushion sections and having sliding engagement with both the cushion sections and said fixed bars, whereby said back sections are free to shift vertically as a unit and horizontally toward and from each other, a plurality of tension means acting to yieldingly resist the relative shifting movement of both pairs of cushion sections in a direction from each other, tension means acting on said back cushion sections to oppose their vertical movement, and means for varying the tension exerted by each of the several tension means.

LEE C. CARLTON.